United States Patent
Tardy-Tuch et al.

(10) Patent No.: US 11,518,407 B2
(45) Date of Patent: Dec. 6, 2022

(54) METHOD FOR OPTIMIZED AUTONOMOUS DRIVING OF A VEHICLE

(71) Applicant: Dr. Ing. h.c. F. Porsche Aktiengesellschaft, Stuttgart (DE)

(72) Inventors: Georg Tardy-Tuch, Unterreichenbach-Kapfenhardt (DE); Florian Strecker, Weissach (DE); Michael Glatz, Weinsberg-Gellmersbach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/011,024

(22) Filed: Sep. 3, 2020

(65) Prior Publication Data

US 2021/0070319 A1 Mar. 11, 2021

(30) Foreign Application Priority Data

Sep. 5, 2019 (DE) ...................... 10 2019 123 900.1

(51) Int. Cl.
*B60W 60/00* (2020.01)
*B60W 40/072* (2012.01)

(52) U.S. Cl.
CPC ...... *B60W 60/0011* (2020.02); *B60W 40/072* (2013.01); *B60W 2510/0676* (2013.01); *B60W 2530/20* (2013.01); *B60W 2530/209* (2020.02)

(58) Field of Classification Search
CPC combination set(s) only.
See application file for complete search history.

(56) References Cited

U.S. PATENT DOCUMENTS

| | | | |
|---|---|---|---|
| 2015/0345959 A1* | 12/2015 | Meuleau | G05D 1/0217 701/23 |
| 2016/0082947 A1* | 3/2016 | Naumann | G05D 1/0223 701/22 |
| 2017/0045418 A1* | 2/2017 | Peperhowe | G06F 30/20 |
| 2018/0099667 A1 | 4/2018 | Abe et al. | |
| 2018/0238696 A1* | 8/2018 | Takeda | G01C 21/3602 |
| 2019/0071100 A1* | 3/2019 | Xavier | G05D 1/0061 |
| 2019/0086925 A1* | 3/2019 | Fan | G05D 1/0088 |
| 2019/0235516 A1* | 8/2019 | Zhang | G08G 1/096725 |

FOREIGN PATENT DOCUMENTS

| | | |
|---|---|---|
| EP | 3517893 A1 | 7/2019 |
| WO | 2017183486 A1 | 10/2017 |

OTHER PUBLICATIONS

Galiläer, Trassierung von Straßenverkehrsanlagen mit der Finiten-Elemlente-Methode: Hochschulschrift: Dresden Techn. Univ Disseration with partial translation, 2010, 158 pages.

* cited by examiner

*Primary Examiner* — Jeff A Burke
*Assistant Examiner* — Madison B Emmett
(74) *Attorney, Agent, or Firm* — RatnerPrestia

(57) ABSTRACT

Method and device for optimized autonomous driving, wherein a trajectory for the actuation of the vehicle is determined. A profile of the trajectory is defined by a bending line of a bending band. The bending line is preferably determined by the finite element method, in particular according to the principle of virtual shifting, and achieves an optimization goal and satisfies a boundary condition. The boundary condition is defined in accordance with a profile of a roadway for the vehicle. The optimization goal is defined by a desired driving property of the vehicle.

15 Claims, 3 Drawing Sheets

METHOD FOR OPTIMIZED AUTONOMOUS DRIVING OF A VEHICLE

CROSS-REFERENCE TO RELATED APPLICATION

Figure 1:
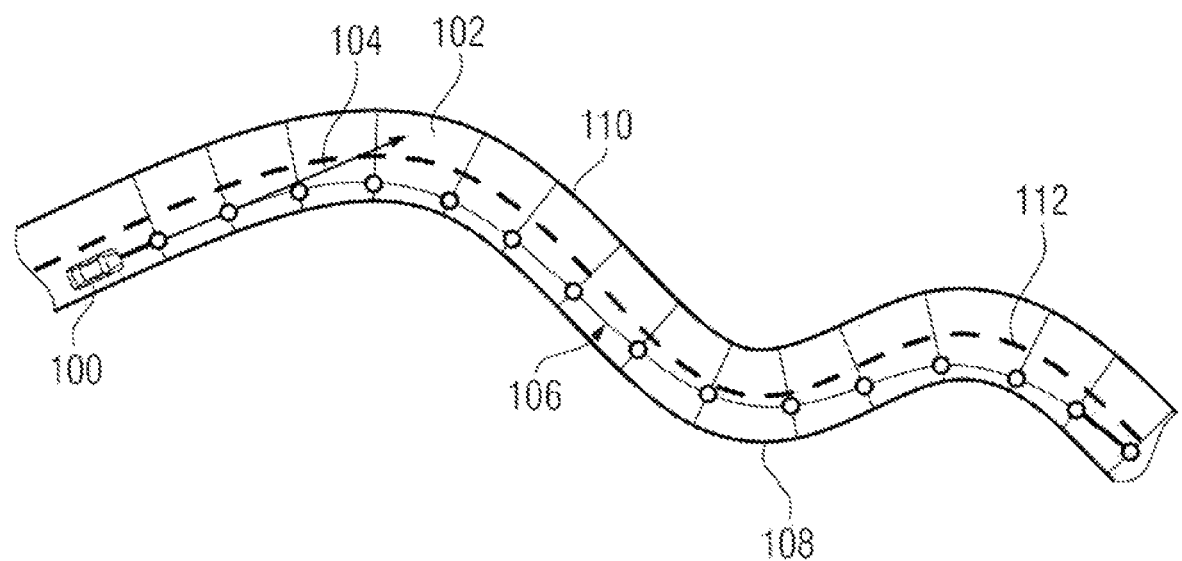

This application claims priority to German Patent Application No. 10 2019 123 900.1, filed Sep. 5, 2019, the content of such application being incorporated by reference herein in its entirety.

FIELD OF THE INVENTION

The invention is based on a method and a device for autonomous driving of a vehicle.

BACKGROUND OF THE INVENTION

US 2018/0099667 A1, which is incorporated herein by reference, discloses the controlling of an autonomous vehicle, wherein left-hand and right-hand boundary lines of a roadway on which the vehicle is driving are calculated. In addition, an ideal route, which runs within an area between the left-hand and right-hand boundary lines, is determined by minimizing the travel distance and by minimizing a deviation from a center line.

WO 2017/183486 A1, which is incorporated herein by reference, discloses a method for generating a trajectory for an autonomous vehicle taking into account the acceleration and braking of the vehicle so that a gentle driving mode is achieved. For this purpose, a trajectory is generated with an inflection point in a curvature change section in which the curvature changes monotonously with respect to the driving distance of the vehicle.

SUMMARY OF THE INVENTION

It is desirable to make available a method which is improved in comparison with the above, and a device which is improved in comparison with the above, for autonomous driving.

This is achieved by means of the subject matter of the independent claims.

A method for optimized autonomous driving provides that a trajectory for the actuation of the vehicle is determined, wherein a profile of the trajectory is defined by a bending line of a bending band, wherein the bending line is preferably determined by means of the finite element method, in particular according to the principle of virtual shifting, and achieves an optimization goal and satisfies a boundary condition, wherein the boundary condition is defined in accordance with a profile of a roadway for the vehicle, and wherein the optimization goal is defined by a desired driving property of the vehicle. This constitutes a calculation method for trajectories, which permits the trajectory properties to be optimized. The trajectory is influenced in a targeted fashion by the use of an optimizer. During autonomous driving, the character of the vehicle and the trajectory are therefore optimized in a situation-related fashion in accordance with the vehicle and its properties.

The bending band is preferably defined by a multiplicity of discrete elements, wherein a parameter which defines a property of the discrete element is determined for at least one of the discrete elements, wherein a setpoint value for the parameter is defined in accordance with the desired driving property, and wherein the optimization goal is defined in accordance with a deviation of the parameter from the setpoint value. A calculation which is based on the method of finite elements and the principle of virtual displacements and which has discrete elements permits the local adaptation of the properties of a trajectory which is discretized in such a way, so that situationally different optimization goals can be pursued.

The bending band preferably has a limited length with a predefined number of discrete elements, wherein just one part of the trajectory is defined in its profile through a bending line of the bending band, wherein while a first part of the trajectory which is defined by the profile of the bending line of a first of the discrete elements is being travelled through, the profile of the bending line of the other discrete elements of the predefined number of discrete elements and of an additional discrete element which is connected to a last of the discrete elements is calculated for a profile of an additional trajectory part which adjoins the part of the trajectory. As a result, only the area which is currently relevant is optimized and the necessary computational expenditure is significantly reduced in comparison with calculation for full-distance planning. This is made possible by local planning with a limited bending band length with a low number of elements, since when the number of elements is doubled the computational expenditure is increased eight fold. This is avoided if a new solution for the remaining band and an additionally connected element is generated while the first element is being travelled through. As a result, the bending band migrates along with the vehicle in respect of elements. The starting conditions for the new solution are derived from the previous solution.

The parameter preferably defines a flexural rigidity, torsional rigidity, longitudinal rigidity or rigidity of a bearing of the discrete element, which centers the discrete element with respect to a representation of the roadway.

The setpoint value is preferably defined in accordance with a longitudinal acceleration or lateral acceleration of the vehicle, the derivation of which or to a limiting value thereof is based, in particular, at a transition from a right-left bend combination or a left-right bend combination. The optimization therefore serves to optimize the avoidance or the combatting of motion sickness symptoms. Changes in the absolute acceleration are experienced differently in different directions and additionally depend in their subject intensity on the vehicle reaction. Therefore, for example a changeover of lateral acceleration, such as takes place in the transition of a right-left bend combination is in some cases more unpleasant than simple breaking or straight-ahead acceleration.

The setpoint value is preferably defined in accordance with a curvature of the trajectory, in particular a curvature radius or a limiting value for said radius. If the curvature of the trajectory is reduced, for example in the region of a lateral-acceleration changeover, the previously described acceleration changeover takes place more slowly and a more gentle driving style is brought about, but with corresponding effects on the speed profile.

The setpoint value is preferably defined in accordance with a desired driving style, in particular for a sporty trajectory or a comfortable trajectory, or in accordance with a vehicle property, in particular a type of drive. By influencing the curvature of a trajectory in a targeted, situation-dependent fashion, in conjunction with matching longitudinal planning, it is possible to implement or accentuate individual driving styles and selected vehicle properties such as, for example, all-wheel drive or rear-wheel drive.

The trajectory is preferably determined in accordance with an optimization goal which is defined in accordance with a plurality of setpoint values and a plurality of parameters, wherein it is checked whether requirements of the setpoint values compete with one another, and wherein the bending line is determined iteratively for various parameters until the optimization goal is achieved. The influencing of the trajectory makes it possible to pursue a plurality of optimization goals simultaneously. However, said goals can bring about partially opposing requirements. A corresponding compromise is then set by changing the optimization specification. Short-term goals can be defined, for example, for overtaking operations or avoidance maneuvers, that is to say for driving situations which occur largely independently of the route profile and are triggered by particular conditions. Local goals optimize, for example, particular occurrences. They can compete with global goals. Global goals are, for example, goals which continuously influence the planning process of the trajectory, such as for example a sporty line or driving which is as uniform as possible. Competing goals occur when a globally calculated trajectory infringes, for example, specifications of the short-term or local goals. For local goals which relate to motion sickness this is, for example, the case when an acceleration increase speed is too high. If such an infringement occurs, this is taken into account in the optimization goals, for example by means of corresponding weighting, and otherwise optimization goals relating to this do not have any effect on the trajectory. A combination of two goals would be to travel through, for example, a selected route in the shortest possible time. This goal can only be achieved under certain circumstances if the driving style is correspondingly adapted, that is to say the time and consumption are adapted as optimization goals.

A first trajectory is preferably determined, wherein at least one changed parameter is determined in particular in accordance with a speed profile for this trajectory, and wherein a second trajectory is determined in accordance with the changed parameter. The first trajectory is a trajectory profile for which the speed profile is determined. On the basis of the trajectory profile and the speed profile it is checked whether element properties are adapted, and if so which. This process is run through until the optimization goal is satisfied. This process can be considerably speeded up by means of a gradient method. During the optimization, in particular element properties such as flexural rigidity, torsional rigidity, longitudinal rigidity and rigidity of the centering bearing are adapted.

Further optimization goals relate to lowest possible energy consumption or input of heat. This is highly interesting with respect to e-mobility. Further optimization goals relate to a reduction in the brake wear and tire wear, minimization of the damage to the vehicle, in particular by limiting the forces applied to the chassis. Likewise, safety aspects can be taken into account by limiting, for example, a degree of utilization of a potential of a tire. Optimization of the driving state, for example of a lateral acceleration, longitudinal acceleration and yaw acceleration, can also be provided. As a result, trajectories for specific driving styles are selectively optimized. Optimization relating to vehicle occupant perception can also be provided. This relates, for example, to a targeted setting in order to reduce travel sickness, motion sickness or in order to increase the driving comfort. For this purpose, it is possible to optimize, for example, the derivation of the lateral acceleration and vertical acceleration, the yaw speed, or the yaw acceleration or the entire input of kinetic energy into the vehicle occupants.

A device for optimized autonomous driving comprises a computing apparatus, a sensing apparatus and an actuation apparatus which are designed to interact in order to execute the method after. The computing apparatus comprises, for example, a trajectory calculator for determining trajectories and an optimizer for determining the element properties which define the bending line for the optimum trajectory.

BRIEF DESCRIPTION OF THE DRAWING FIGURES

Figure 2:
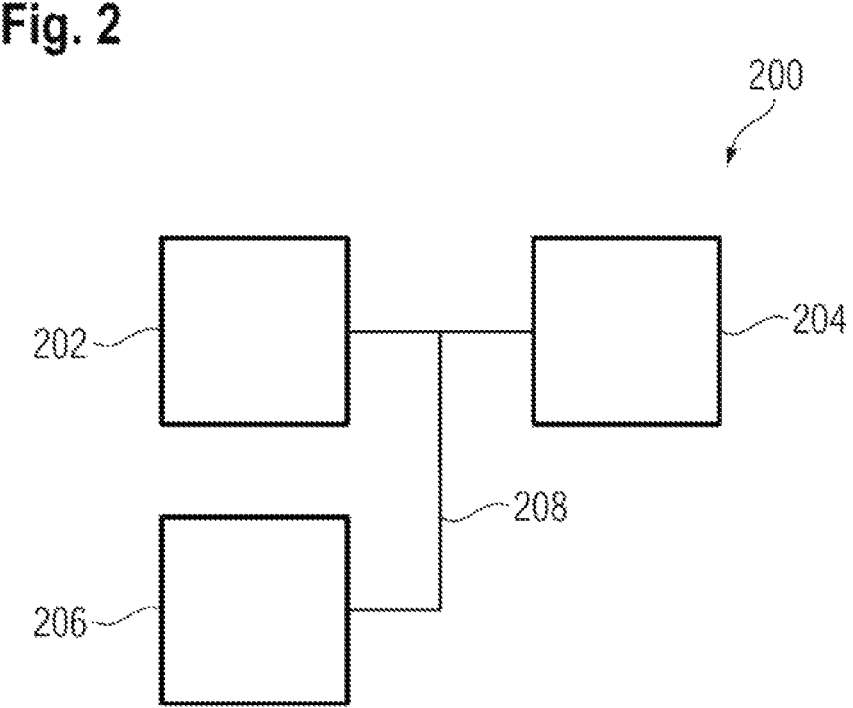
Figure 3A:
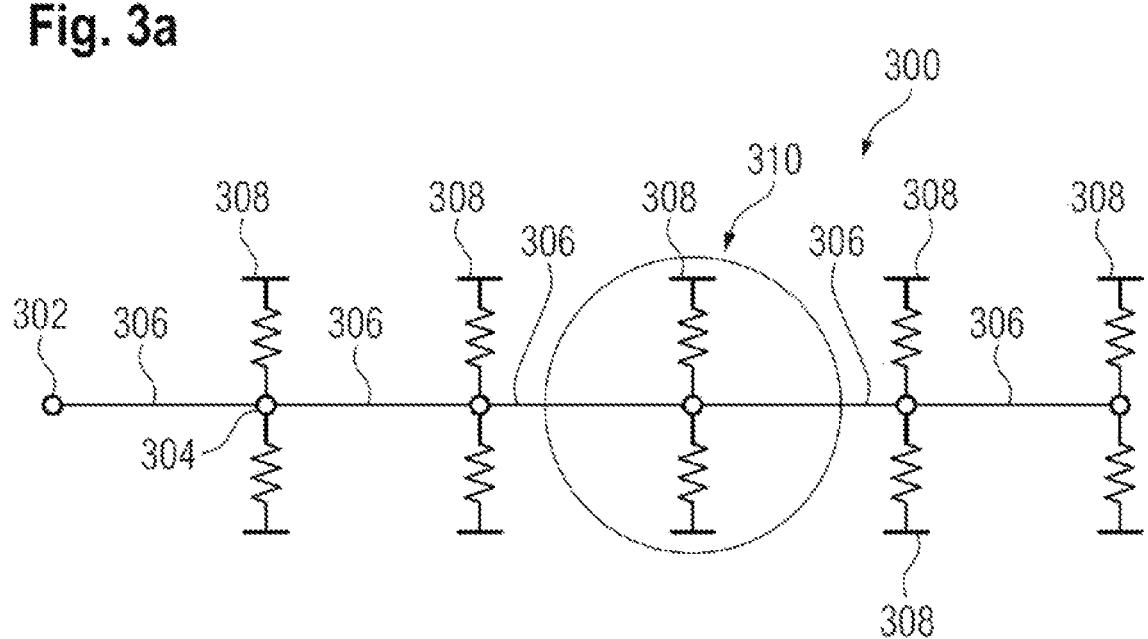
Figure 3B:
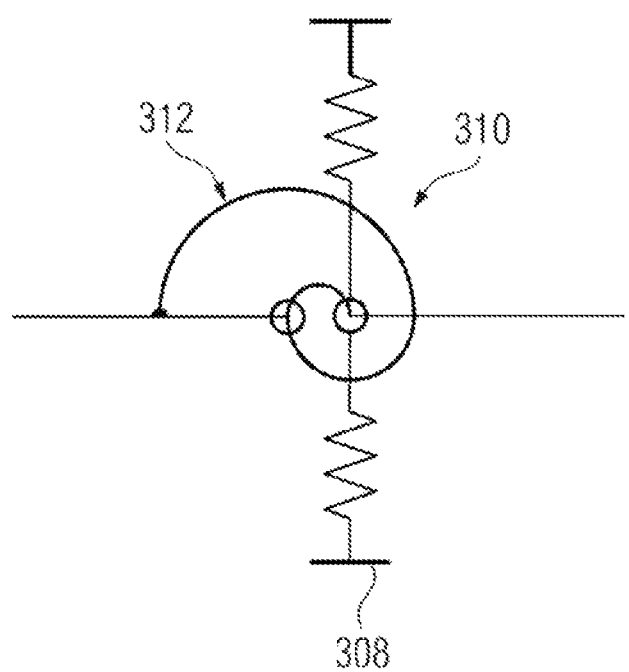
Figure 4:
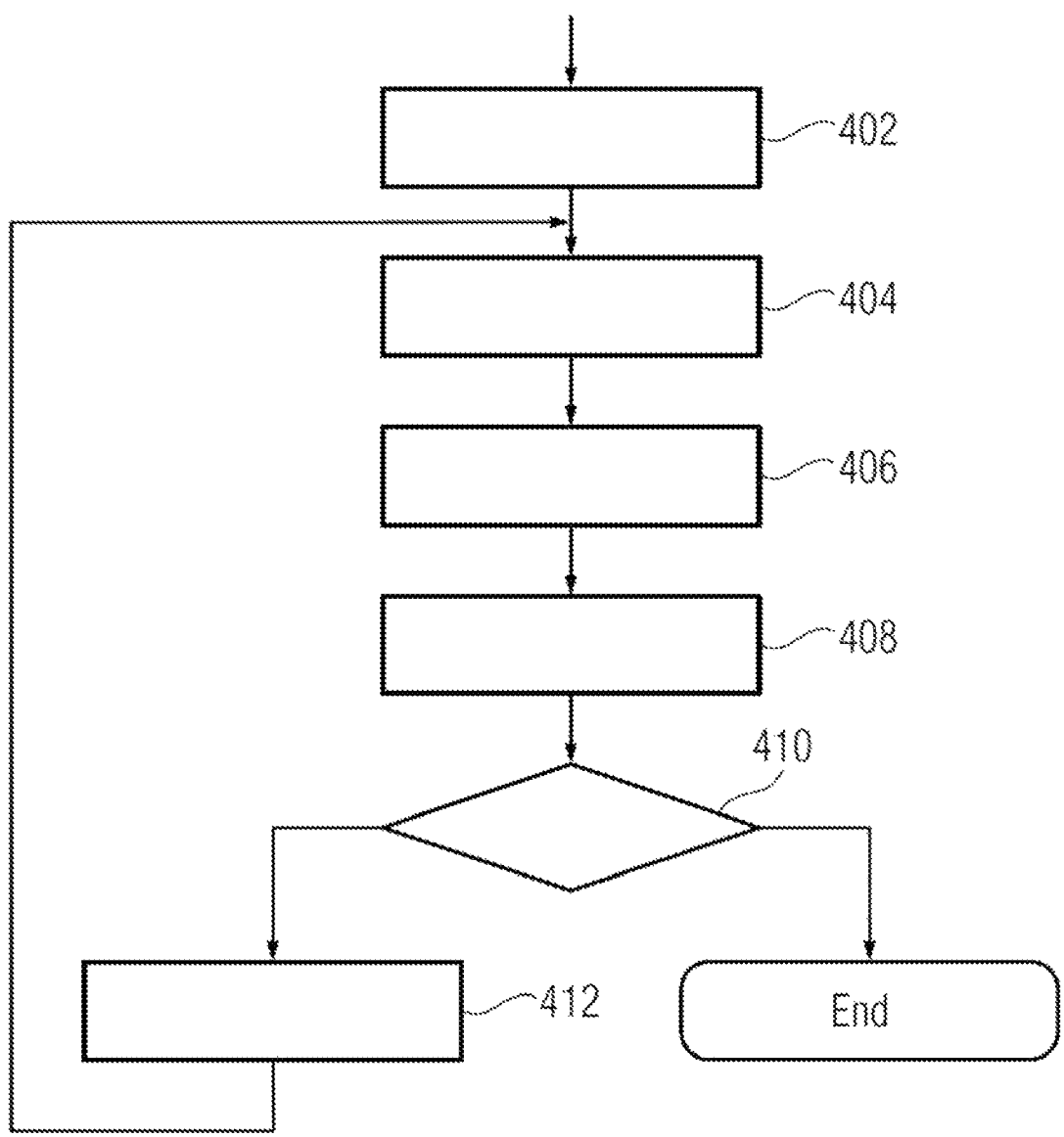

Further advantageous embodiments can be found in the following description and the drawing, in which FIG. 1 shows a schematic illustration of a trajectory and of a roadway, FIG. 2 shows a schematic illustration of parts of a device for autonomous driving, FIGS. 3a and 3b show details of a model of a bending band, and FIG. 4 shows steps in a method for autonomous driving.

DETAILED DESCRIPTION OF THE INVENTION

FIG. 1 illustrates a schematic illustration of a roadway 102 for autonomous driving of a vehicle 100. In the example, the vehicle 100 is moving forward in a direction of travel 104. In FIG. 1, a trajectory 106 for driving on the roadway 102 is illustrated. The trajectory 106 is one of a plurality of possible trajectories with which the vehicle 100 can be moved on the roadway 102. The tangent with respect to the trajectory 106 indicates the direction of travel 104 in the example. The trajectory 106 starts directly for the vehicle 100.

The roadway 102 is a roadway boundary. In the example, a right-hand side boundary 108 is illustrated arranged to the right of the trajectory 106 with respect to the direction of travel 104 and a left-hand side boundary 110 is illustrated arranged to the left of the trajectory 106 with respect to the direction of travel 104. A center reservation 112 runs centrally with respect to the side boundaries in the example. The roadway boundary can be defined optionally by the side boundaries or by the central reservation and one of the side boundaries.

FIG. 2 illustrates a device 200 for autonomous driving. The device 200 comprises a computing apparatus 202, a sensing apparatus 204 and an actuation apparatus 206, which are connected by a data line 208 and are designed to interact in order to execute a method described with reference to FIG. 4. The computing apparatus 202 is, for example, a microprocessor. The actuation apparatus 206 is designed to specify a direction of travel 104 according to the trajectory 106 for the vehicle 100, or to steer the vehicle 100 in this direction of travel 104. The sensing apparatus 204 is designed to acquire and make available information about the roadway 102 and/or the roadway boundary.

The trajectory 106 is modelled for the method by means of a bending band 300 which is illustrated schematically in FIG. 3a. A node 302 in FIG. 3a is illustrated for the start of the trajectory 106. Discrete elements 306 which are arranged between the nodes model parts of the trajectory 106. In the example illustrated in FIG. 3a, a respective flexural rigidity is implemented at a node 304 by a spring element 308. It is additionally or alternatively possible to model flexural rigidity in the discrete elements 306.

FIG. 3b shows a view of detail of a node 310 from FIG. 3a. In the example, an additional spring element 312 models tensile rigidity in addition to flexural rigidity for the node 310.

This additional spring element 312 can be defined for the bending band 300 or the discrete elements 306 of the bending band 300. A spring element 312 acts on a node for the bending band 300 or for the discrete element. The other nodes of the bending band 300 can also be modelled.

The element rigidity for the bending band 300 or a discrete element 306 of the bending band 300 can be modelled and set by means of these spring elements.

The bending band 300 is modelled in the example as a virtual numerical bending band with properties which can be defined by the flexural rigidity and/or tensile rigidity, the tension.

In the aspect illustrated in the example, the bending band 300 comprises an equidistant sequence of discrete elements 306. The discrete elements 306 are defined in the example as rod bars of the same length. There is no need to use an equidistant sequence of discrete elements 306, but rather the length of the discrete elements 306 can vary.

Since the bending band 300 in this aspect is also composed of individual elements with individually adaptable rigidity, the bending line can be changed by changing the element properties. The local curvature can be reduced, for example, by increasing the rigidity in the corresponding elements. As a result, it is possible to change the trajectory 106. Therefore, a different driving behavior is achieved and can also be adjusted locally. The parameters with which these element properties are changed are specified and optimized as described in the method below.

The bending band 300 has in one aspect a limited length with a specified number of discrete elements 306. Only part of the trajectory 106 is defined in the profile thereof by a bending line of the bending band 300. While a first part of the trajectory 106 which is defined by the profile of the bending line of a first of the discrete elements 306 is being travelled through, in this aspect the profile of the bending line of the other discrete elements 306 of the specified number of discrete elements 306 and of an additional discrete element which is connected to a last of the discrete elements 306 is calculated. The additional connected discrete element defines the profile of an additional trajectory part which adjoins the part of the trajectory.

Starting conditions for the new solution are derived from the previous solution. As a result, while the first element 306 is being travelled through, a new solution for the remaining band and an additionally connected element are generated. This means that the bending band migrates along with the vehicle 100 in respect of elements.

In the following, the method will be described for the calculation of the trajectory 106. A corresponding procedure is adopted for parts of the trajectory 106, wherein in each case an additional discrete element 306 for the calculation of the bending line of the bending band 200 is connected to the end, respectively starting from the predefined number of discrete elements 306.

The method starts in the example when the calculation of the trajectory 106 is triggered in accordance with a position of the vehicle 100, in particular with respect to a previously determined trajectory, or with timed control.

After the start, in a step 402 a setpoint value is determined for at least one parameter.

If the bending band 300 is defined by a multiplicity of discrete elements 306 there can be provision that a separate parameter is defined for at least one of the discrete elements 306, which parameter defining a property of this discrete element 306. For this parameter it is possible to define a separate setpoint value in accordance with the desired driving property and separately from the other setpoint values.

The optimization goal is defined in this case, in particular, additionally in accordance with a deviation of this parameter from this setpoint value.

The parameter can define a curvature, flexural rigidity, torsional rigidity or longitudinal rigidity. The parameter can define the rigidity of a bearing of the discrete element 306 which centers the discrete element 306 with respect to a representation of the roadway.

The representation of the roadway is, for example, a virtual numerical corridor in which the bending band must run so that the trajectory 106 does not leave the roadway boundary.

In the simplest case, homogeneous rigidity, i.e. the same parameter for all nodes or discrete elements 306, is used, as a result of which a trajectory 106 with minimal curvature is calculated.

The setpoint value is specified, for example, in accordance with a desired driving behavior. This can be defined by a driver input or in accordance with a vehicle property.

By means of a corresponding setpoint value it is possible to specify, for example, that a trajectory 106, which can be travelled through at the limit, is to be determined. In this context there is, for example, a grip limit, i.e. a limit based on the contact between the tire and the road which limits e.g. lateral guidance and longitudinal deceleration. A further limit is a power limit, i.e. an acceleration capacity of the vehicle 100. These limits are, however, not inverse for the driving state. For example, the vehicle 100 can generally decelerate with more power than acceleration. The grip limit is additionally dependent on the driving situation.

Other setpoint values permit a trajectory 106 which is not planned at the limit to be determined.

The setpoint value can be defined in accordance with a longitudinal acceleration or lateral acceleration for the vehicle 100 whose derivation or to a limiting value for the latter can be defined, in particular, at a transition from a right-left bend combination or a left-right bend combination.

The setpoint value can be defined in accordance with a curvature of the trajectory 106, in particular a curvature radius or a limiting value for the latter.

The setpoint value can be defined in accordance with a desired driving style, in particular for a sporty trajectory or a comfortable trajectory or in accordance with a vehicle property, in particular a type of drive.

The setpoint value can be defined in accordance with an engine temperature, a tire temperature, a fuel consumption value, a velocity or an average value for the latter.

A step 404 is then executed.

In step 404, an optimization goal is determined in accordance with the parameter and the setpoint value. For example, a least square which is to be minimized in the optimization, for the deviation of the parameter from the setpoint value as an optimization goal. The optimization goal can be defined in respect of elements.

The optimization goal is therefore defined by a desired driving property of the vehicle 100.

A step 406 is subsequently executed.

In the step 406, the bending line which achieves the optimization goal and satisfies a boundary condition is determined according to the principle of virtual shifting, preferably by means of the finite element method. If the optimization goal cannot be achieved, there can optionally be provision to determine the trajectory which comes closest to the optimization goal.

The boundary condition is defined in accordance with a profile of the roadway 102 for the vehicle 100. The boundary condition is defined, for example, in such a way that the trajectory 106 corresponding to the bending line does not leave the roadway boundary.

A step 408 is subsequently carried out.

In a step 408, the trajectory 106 is determined for the actuation of the vehicle 100.

The profile of the trajectory 106 is defined by the bending line of the bending band 300.

Subsequently, an optional step 410 is executed. The step 410 is executed when the trajectory 106 is determined in accordance with an optimization goal which is defined in accordance with a plurality of setpoint values and a plurality of parameters.

In the optional step 410 it is checked whether the requirements of the setpoint values compete with one another and whether the optimization goal has been achieved. If the optimization goal has been achieved, the method ends.

If the optimization goal has not been achieved, a step 412 is executed.

In step 412, at least one parameter is changed.

In the example, for this purpose the trajectory 106 is considered to be a first trajectory and at least one changed parameter is determined in accordance with the first trajectory, in particular in accordance with a speed profile for this first trajectory.

The step 404 is subsequently executed. As a result, a second trajectory is determined in accordance with the changed parameter. If appropriate, further trajectories are correspondingly determined until the optimization goal is achieved. As a result, the bending line is determined iteratively for various parameters until the optimization goal is achieved.

The method subsequently ends.

The bending line can also be determined for a section of the trajectory 106 for driving in a segment. The start of the section and the end of the section are in this case defined by nodes of the bending band 300, which connects a discrete element 306 of the bending band 300. The determination of the section takes place in an analogous fashion in this case. In this context, the parameters and setpoint values for this section, i.e. the journey through the corresponding segment, can be optimized separately.

What is claimed:

1. A method for optimized autonomous driving of a vehicle, the method comprising:
    determining, by a processor of a vehicle, a trajectory for the vehicle;
    defining, by the processor of the vehicle, a profile of the trajectory using as a model a bending band, the bending band comprised of a node comprising:
    a) discrete structural elements connected to each other at a-the node and arranged along a longitudinal bearing, the discrete structural elements having a respective longitudinal rigidity that resist deviation from the longitudinal bearing,
    b) a set of compression springs connected to one of the discrete structural elements of the node, the springs extending transversely from opposite sides of the node, the compression springs each having a respective flexural rigidity that resist deviation from the longitudinal bearing, and
    c) a coiled torsion spring that interconnects the discrete structural elements together at the node, the coiled torsion spring having a torsional rigidity that resists deviation from the longitudinal bearing, the coiled torsion spring having (i) a first end connected to one of the discrete structural elements, (ii) a central part connected to an end of said one of the discrete structural elements, and (iii) a second end connected to an end of the other discrete structural element of the discrete structural elements as well as the set of compression springs;
    determining, by the processor of the vehicle, a bending line of the bending band which deviates from the longitudinal bearing and achieves an optimization goal and satisfies a boundary condition using a finite element method;
    defining, by the processor of the vehicle, the boundary condition in accordance with a profile of a roadway for the vehicle;
    defining, by the processor of the vehicle, the optimization goal by a desired driving property of the vehicle; and
    controlling, by the processor of the vehicle, an actuator to autonomously drive the vehicle along the trajectory according to the bending line which achieves the optimization goal.

2. The method as claimed in claim 1, wherein the bending band is defined by a multiplicity of the discrete elements, wherein a parameter which defines a property of the discrete elements is determined for at least one of the discrete elements, wherein a setpoint value for the parameter is defined in accordance with the desired driving property, and wherein the optimization goal is defined in accordance with a deviation of the parameter from the setpoint value.

3. The method as claimed in claim 2, wherein the parameter defines a flexural rigidity, torsional rigidity, longitudinal rigidity or rigidity of a bearing of said at least one of the discrete elements which centers said at least one of the discrete elements with respect to a representation of the roadway.

4. The method as claimed in claim 2, wherein the setpoint value is defined in accordance with a longitudinal acceleration or lateral acceleration of the vehicle, the derivation of which or to a limiting value thereof is based at a transition from a right-left bend combination or a left-right bend combination.

5. The method as claimed in claim 2, wherein the setpoint value is defined in accordance with a curvature radius or a limiting value for said curvature radius.

6. The method as claimed in claim 2, wherein the setpoint value is defined in accordance with driver input of a desired driving style.

7. The method as claimed in claim 2, wherein the setpoint value is defined in accordance with an engine temperature, a tire temperature, or a fuel consumption value.

8. The method as claimed in claim 2, wherein the trajectory is determined in accordance with an optimization goal which is defined in accordance with a plurality of setpoint values and a plurality of parameters, the method further comprising checking whether requirements of the setpoint values compete with one another, and wherein the bending line is determined iteratively for various parameters until the optimization goal is achieved.

9. The method as claimed in claim 8, further comprising:
    determining a first trajectory,
    determining at least one changed parameter in accordance with a speed profile for the first trajectory, and
    determining a second trajectory in accordance with the changed parameter.

10. The method as claimed in claim 1, wherein the bending band has a limited length with a predefined number of the discrete elements, wherein just one part of the trajectory is defined in its profile through a bending line of the bending band, wherein while a first part of the trajectory which is defined by the profile of the bending line of a first of the discrete elements is being travelled through, the profile of the bending line of the other discrete elements of the predefined number of discrete elements and of an additional discrete element which is connected to a last of the discrete elements is calculated for a profile of an additional trajectory part which adjoins the part of the trajectory.

11. A device for optimized autonomous driving, wherein the device comprises a computing apparatus, a sensing apparatus and an actuation apparatus which are configured to interact in order to execute the method as claimed in claim 1.

12. The method as claimed in claim 1, wherein the bending band is comprised of a plurality of said nodes.

13. The method as claimed in claim 12, wherein said nodes are arranged in parallel.

14. The method as claimed in claim 12, wherein adjacent nodes of said nodes share one the discrete structural elements.

15. The method as claimed in claim 1, wherein the discrete structural elements are not directly connected to each other.

* * * * *